(12) United States Patent
Tudoran et al.

(10) Patent No.: US 11,487,764 B2
(45) Date of Patent: Nov. 1, 2022

(54) SYSTEM AND METHOD FOR STREAM PROCESSING

(71) Applicant: Huawei Cloud Computing Technologies Co., Ltd., Gui'an New District (CN)

(72) Inventors: Radu Tudoran, Munich (DE); Stefano Bortoli, Munich (DE); Xing Zhu, Shanghai (CN); Goetz Brasche, Munich (DE); Cristian Axenie, Munich (DE)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

(21) Appl. No.: 16/827,122

(22) Filed: Mar. 23, 2020

(65) Prior Publication Data
US 2020/0285646 A1 Sep. 10, 2020

Related U.S. Application Data (63) Continuation of application No. PCT/EP2017/073956, filed on Sep. 21, 2017.

(51) Int. Cl.
*G06F 16/2455* (2019.01)

(52) U.S. Cl.
CPC .. *G06F 16/24568* (2019.01); *G06F 16/24552* (2019.01)

(58) Field of Classification Search
CPC .............. G06F 16/24568; G06F 16/24552
(Continued)

(56) References Cited

U.S. PATENT DOCUMENTS 5,790,829 A 8/1998 Flynn
10,152,251 B2 * 12/2018 Sancheti ............ G06F 11/2025
(Continued)

FOREIGN PATENT DOCUMENTS

CN 1719832 A 1/2006
CN 102509062 A 6/2012
(Continued)

OTHER PUBLICATIONS

Ghanem et al., "Incremental Evaluation of Sliding-Window Queries over Data Streams," IEEE Transactions on Knowledge and Data Engineering, vol. 19, No. 1, XP11151238AI, pp. 57-72, Institute of Electrical and Electronics Engineers, New York, New York (Jan. 2007).
(Continued)

*Primary Examiner* — Robert W Beausoliel, Jr.
*Assistant Examiner* — Arthur Ganger
(74) *Attorney, Agent, or Firm* — Leydig, Volt & Mayer, Ltd.

(57) ABSTRACT

An input stream of events is processed to obtain an output stream of events. Consecutive events are selected from the input stream using a sliding window to obtain sliding window events, then a function is applied thereto to obtain an output result value. Operations of: outputting the output result value in the output stream; splitting the sliding window events into filter-complying events and pending events; applying the function on the pending events to obtain preliminary value(s); selecting, from the input stream, a second plurality of events; adding the second plurality of events to the sliding window events; removing, from the sliding window events, the filter-complying events to obtain a new set of sliding window events; and applying the function to the second plurality of events and the prelimi-
(Continued)

nary value(s) to obtain a new output result value, are then iteratively performed.

11 Claims, 8 Drawing Sheets

(58) Field of Classification Search
USPC .......................................................... 707/713
See application file for complete search history.

(56) References Cited

U.S. PATENT DOCUMENTS

| | | |
|---|---|---|
| 2013/0066855 A1 | 3/2013 | Gupta et al. |
| 2013/0346970 A1 | 12/2013 | Lam et al. |
| 2014/0040915 A1 | 2/2014 | Chen et al. |
| 2014/0195480 A1* | 7/2014 | Talagala .............. G06F 16/2365 707/610 |
| 2016/0179588 A1 | 6/2016 | Raman et al. |
| 2018/0046671 A1* | 2/2018 | Baba ................ G06F 16/24532 |

FOREIGN PATENT DOCUMENTS

| | | |
|---|---|---|
| CN | 102799899 A | 11/2012 |
| CN | 102841917 A | 12/2012 |
| CN | 104956333 A | 9/2015 |
| CN | 106664322 A | 5/2017 |
| WO | 2017072567 A1 | 5/2017 |

OTHER PUBLICATIONS

Li Run-heng et al.,"Method for anomaly detection in network security event stream," Journal on Communications, vol. 30 No. 12, total 10 pages (Dec. 2009). With English abstract.

Swinnen et al., "Querying Event Logs: Discovering non-events in event logs," 2010 IEEE International Conference an Intelligent Systems and Knowledge Engineering, pp. 349-354, total 6 pages, Institute of Electrical and Electronics, Engineers, New York, New York (2010).

To et al., "A Survey of State Management in Big Data Processing Systems," arxiv.org, Cornell University Library, XP081413873, total 25 pages (Feb. 6, 2017).

* cited by examiner

SYSTEM AND METHOD FOR STREAM PROCESSING

CROSS-REFERENCE TO RELATED APPLICATIONS

This application is a continuation of International Application No. PCT/EP2017/073956, filed on Sep. 21, 2017, the disclosure of which is hereby incorporated by reference in its entirety.

TECHNICAL FIELD

The present disclosure, in some embodiments thereof, relates to a system for processing a stream of data and, more specifically, but not exclusively, to distributed processing of data in big data systems.

BACKGROUND

The term big data is used to refer to a collection of data so large and/or so complex that traditional data processing application software cannot deal with the collection adequately. Among the challenges in dealing with big data is analysis of the large amount of data in the collection. In some systems, the data is an ordered sequence of data instances or events, referred to as a stream of data or a stream of events.

In typical batch processing systems, data may be accessed as many times as needed to perform the required processing. In stream processing systems, data arrives continuously and cannot be stored for future reference. There may be a need to continuously calculate, on the fly, mathematical or statistical analytics within the stream of events. In some systems, there is a need to handle high volumes of data in real time. In addition, there may be a need for the system to be scalable and have a fault tolerant architecture.

Some stream processing systems use window stream operators. A window stream operator is a software object for processing a set of data instances (also referred to as events), selected by applying a filter to some of the events of the stream of events. The set of selected events is called a window of events. After applying the filter, a typical window stream operator discards the remaining events, i.e. events out of the scope of the filter, and stores only events within the scope of the filter. In some systems, the amount of events falling within the scope of the filter is large and beyond the capacity of a single window stream operator's local memory.

SUMMARY

The present disclosure provides a system and a method for processing a stream of data.

According to a first aspect of the disclosure, a method for processing an input stream of events, to obtain an output stream of events, is provided. The method comprises the steps: selecting, from the input stream of events, a plurality of consecutive events using a sliding window to obtain sliding window events; applying a function to the sliding window events to obtain an output result value; in each of a plurality of iterations: outputting the output result value on the output stream of events; splitting the sliding window events into a set of complying events satisfying at least one filter test and a set of pending events; applying the function on the set of pending events to obtain at least one preliminary value; selecting, from the input stream of events, a second plurality of events; adding the second plurality of events to the sliding window events; removing, from the sliding window events, the set of complying events to obtain a new set of sliding window events; applying the function to the second plurality of events, and the at least one preliminary value to obtain a new output result value.

The method will use a fixed amount of resources—both in terms of local cache memory and computation effort. Such a specification overcomes traditional topologies which, due to their feature implementations, are provided initially with fixed computational resources and are not able to adapt at runtime. In this case, fixed resources are likely to render over-provisioning or under-provisioning scenarios for changing streaming data rates. The method addresses this problem by operating with a very low resource footprint, through its efficient computation of features. In this context, the feature functions are optimized to be computed incrementally, updating pre-computed states (i.e. stateful processing). The efficient resource usage and the incremental update enables the solution to compute multiple features at the same time, and even combine features for more complex analytics. Additionally, the method restricts the cached data to the events that are potentially involved in the incremental updates, thus keeping memory usage constant. Consequently, it is possible to globally compute features over the entire stream or sub-domains of the stream with very low latencies (millisecond level). A key benefit is to enable low latency accounting of features over the input data stream, even for high rates of incoming events.

According to a second aspect of the disclosure, a system for processing an input stream of events, using a function f, to obtain an output stream of events, is provided. The system is configured to: select, from the input stream of events, a plurality of consecutive events using a sliding window, as sliding window events; apply the function to the sliding window events to obtain an output result value; in each of a plurality of iterations: output the output result value on the output stream of events; split the sliding window events into a set of complying events that satisfy at least one filter test and a set of pending events; apply the function on the set of pending events to obtain at least one preliminary value; select, from the stream of events, a second plurality of events; add the second plurality of events to the sliding window events; remove, from the sliding window events, the set of complying events to obtain a new set of sliding window events; apply the function to the second plurality of events, and the at least one preliminary value to obtain a new output result value.

With reference to the first and second aspects, in a first possible implementation of the first and second aspects of the present disclosure, the set of complying events and the at least one preliminary value are stored in a cache memory, and the set of pending events is stored in a non-volatile memory.

Storing only some of a stream's events in cache memory and remaining events in non-volatile storage reduces memory requirements and allows reducing costs of implementing a system. Storing some of a stream's events in cache memory and not in non-volatile storage allows faster access to the some events than to events stored in non-volatile storage, allowing lowered latency in processing stream events. Preparing at least one preliminary result value (i.e., cached result value) and storing this value in the cache memory for a next iteration allows lowered latency in processing stream events.

With reference to the first and second aspects, in a further implementation, each of the events of a stream of events has an event value. The at least one cached result value (preliminary value) is from a group consisting of a basic function value and a composite function value. The basic function value is optionally selected from a group of basic function values consisting of: an average value of a plurality of event values of a plurality of events of the stream of events, a minimum value of the plurality of event values, a maximum value of the plurality of event values, an amount of values in the plurality of event values, an amount of distinct values in the plurality of event values, a sum of the plurality of event values, a median value of the plurality of event values, a quartile value of the plurality of event values, a standard deviation value of the plurality of event values, and a variance value of the plurality of event values. The composite function value is optionally computed by performing one or more arithmetic operations between one or more basic function values selected from the group of basic function values. These values may be used for computing a variety of features, including but not limited to, an average value in a plurality of values in a stream of events, a median value in the plurality of values in the stream of events, a minimum value in the plurality of values in the stream of events, and a maximum value in the plurality of values in the stream of events.

With reference to the first and second aspects, in a further implementation, the plurality of pending events is split into a plurality of buckets (i.e., groups) of pending events according to compliance with at least one second filter test. The at least one preliminary value (cached result value) comprises a value produced by the at least one processor applying the function to at least one of the buckets of pending events. Splitting the plurality of pending events into buckets (i.e., groups) and storing in the cache memory preliminary values corresponding to each bucket enables low latency computation of some features including, but not limited to, a median value and quartile value.

With reference to the first and second aspects, in a further implementation, the step of applying the function to the second plurality of events, and the at least one preliminary value, to obtain a new output result value, comprises: retrieving the at least one preliminary value from the cache memory; applying the function to the second plurality of events to obtain a head result; and applying the function to the head result and the plurality of preliminary values to obtain the new output result value.

This provides for an incremental computation of the function on the events of the stream in a very efficient way by buffering just the right data—the new events—and reusing cached result values from the function applied in the previous iteration.

With reference to the first and second aspects, in a further implementation, the at least one preliminary value (i.e., cached result value) comprises a plurality of minimum or maximum values, each a minimum value or a maximum value of a plurality of event values of the plurality of events in one of the plurality of groups of pending events. Storing in the cache memory a minimum value or a maximum value related to one or more of the groups enables low latency computation of some features including, but not limited to, a minimum value of a plurality of event values and a maximum value of a plurality of event values.

With reference to the first and second aspects, in a further implementation, the at least one preliminary value (i.e., cached result value) comprises a plurality of range values, each of the range values comprising a minimum value and a maximum value of the plurality of values of the plurality of events in one of the plurality of groups of pending events. Storing in the cache memory a range value related to one or more of the groups enables low latency computation of some features including, but not limited to, a meridian or quartile value of a plurality of event values.

With reference to the first and second aspects, in a further implementation, the at least one cached result value comprises a plurality of bucket count values, each counting an amount of events in one of the plurality of buckets of pending events.

With reference to the first and second aspects, in a further implementation, all event values in at least a first of the plurality of buckets of pending events succeed all event values in a second of the plurality of buckets of pending events according to an identified ordering function. Sorting the plurality of pending events according to an identified ordering function enables low latency computation of some features including, but not limited to, a meridian or quartile value of a plurality of event values.

With reference to the first and second aspects, in a further implementation, each of the events of the stream of events has a time value. The time value is selected from a group consisting of a time of arrival, a time of creation, and a time of occurrence. The time value also may be equal to a current time of the compute unit/operator. This is the processing time case, where the time of the compute unit is taken as a reference. This can be distinct from the time of arrival of the event, as the time of arrival can be the time when the event arrived in the processing system, which can happen at a different machine and moment than the one that currently performs the computation.

Some events of the plurality of complying events have a time value earlier than a time value of any of the plurality of pending events or later than a time value of any of the plurality of pending events. Storing in the cache memory earliest events and latest events enables low latency computation of features including, but not limited to, a sum or an average value of a plurality of event values.

With reference to the first and second aspects, in a further implementation, the cache memory is a random access memory. Using random access memory enables quick access to the plurality of complying events and the at least one cached result values (preliminary value), enabling low latency computation of features for a plurality of events in a stream of events.

With reference to the first and second aspects, in a further implementation, the at least one non-volatile storage is selected from a group consisting of: a hard disk electrically connected to the at least one hardware processor, and a network storage connected to the at least one hardware processor via a network interface electrically connected to the at least one hardware processor. Optionally, memory media, flash drives, or SSDs can be employed. Network storage provides flexibility in storage size, important in systems processing large amounts of data. Access to a hard disk is less vulnerable to network security breaches than a network connection; using a hard disk is useful in security sensitive stream processing systems.

With reference to the first and second aspects, in a further implementation, the at least one non-volatile storage comprises at least one storage system selected from a group consisting of: a database, a local file system, a distributed file system, and a cloud storage. Databases, local file systems, and distributed file systems provide means for organizing stored data.

According to a third aspect of the disclosure, a computer program is provided comprising program code configured to perform a method according to the first aspect and any implementations thereof.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

The present disclosure, in some embodiments thereof, relates to a system for processing a stream of data and, more specifically, but not exclusively, to distributed processing of data in big data systems.

As used herein, the term "event" means a data instance and the term "stream of events" means a continuous ordered sequence of data instances or events.

A window stream operator is a software object for processing a window of data instances (also referred to as events), selected by applying a filter to some events of the stream of events. As used herein, the term "operator" means a window stream operator.

In a typical system using window stream operators, each operator applies a function to events it receives, and produces an output stream of events. A typical operator applies the function over a sliding window of events, and at any given moment has a working set of events. The function may be a computation function, applied to the working set of events and resulting in a result event sent to another operator on an output stream of results of the operator. As the operator receives events in a continuous stream of events, the operator adds the received events to its working set of events. At a trigger, the operator selects a window of events by applying a filter to its working set of events and selecting only events that match the filter. Other events remaining after applying the filter, i.e. events out of the scope of the filter, are discarded. Typically, the window of events is a group of events, each having a certain property with a value within certain finite boundaries. The trigger may be reception of an event or a time interval since last selecting a window of events. In some systems, the operator applies its computation function after selecting a window of events (the sliding window). The result event pertains to the entire window of events.

Henceforth, the term "window" means "window of events", and the term global feature means "a result event computed on an entire window of events".

In a typical stream processing system, each operator stores its entire working set of events in a digital memory local to the operator, allowing quick access to an entire window when applying the operator's function to the window to compute a global feature. In some stream processing systems, a window of a single operator comprises a large amount of events, beyond the operator's local digital memory's capacity. In addition, memory and processing resources required for computation of some functions increases as the amount of events in the window increases. In some systems, resource requirements for computing a function make computation of the global feature by applying a function to all events of the window impossible for large windows. For example, the amount of events in one year may be so great that a typical window operator cannot store all the events in the one year, making computation of a global feature, such as an average or a maximum value, for a year impossible to compute in such a typical operator. Examples of events that generate a large amount of data over time are credit card transactions over a period of a year or several years and temperature measurements over a period of a month, a year or several years.

According to the present invention, in some embodiments thereof, an operator stores in digital memory only some of the events of the window, storing remaining events in non-volatile digital storage. The some of the events stored in digital memory are the relevant events, and the remaining events, stored in non-volatile digital storage, are referred the pending events. In addition, in these embodiments, the operator stores in digital memory one or more cached result values produced by applying one or more preliminary functions to the stream of data. Stream processing is performed continuously and iteratively, where in each iteration one or more new events are received. The operator in these embodiments applies in each iteration one or more computation functions to the some of the events in storage (the relevant events), the one or more new events and the one or more cached values, to produce an output event comprising the global feature, and one or more cached result values. In addition, in each iteration, the operator may update the relevant events and the pending events with the received events.

Applying the one or more preliminary functions and producing the one or more cached result values, allows incremental computation of the global feature, where the global feature is produced without requiring access to all the events of the window. This reduces the amount of memory and computational resources required to compute some global features, such as an average value, a median value and a maximum value. In addition, computation may be faster than when using all the events in the window, allowing implementation of applications requiring low latency computations. Storing only some of the events of the window in the digital memory allows limiting the amount of digital memory required by the operator, reducing the stream processing system's cost. Besides limiting the amount of digital memory required by the operator, the present invention in some embodiments thereof allows the amount of digital memory used by one operator to be fixed over time, enabling reducing costs by eliminating the need to provide memory for peaks or expansions. Besides reducing the computational resources required to compute some global features in some embodiments the present invention allows computing some global features using a constant amount of computational operations, regardless of the amount of events of the window. This enables building systems with predictable and constant performance, regardless of peaks of received events.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
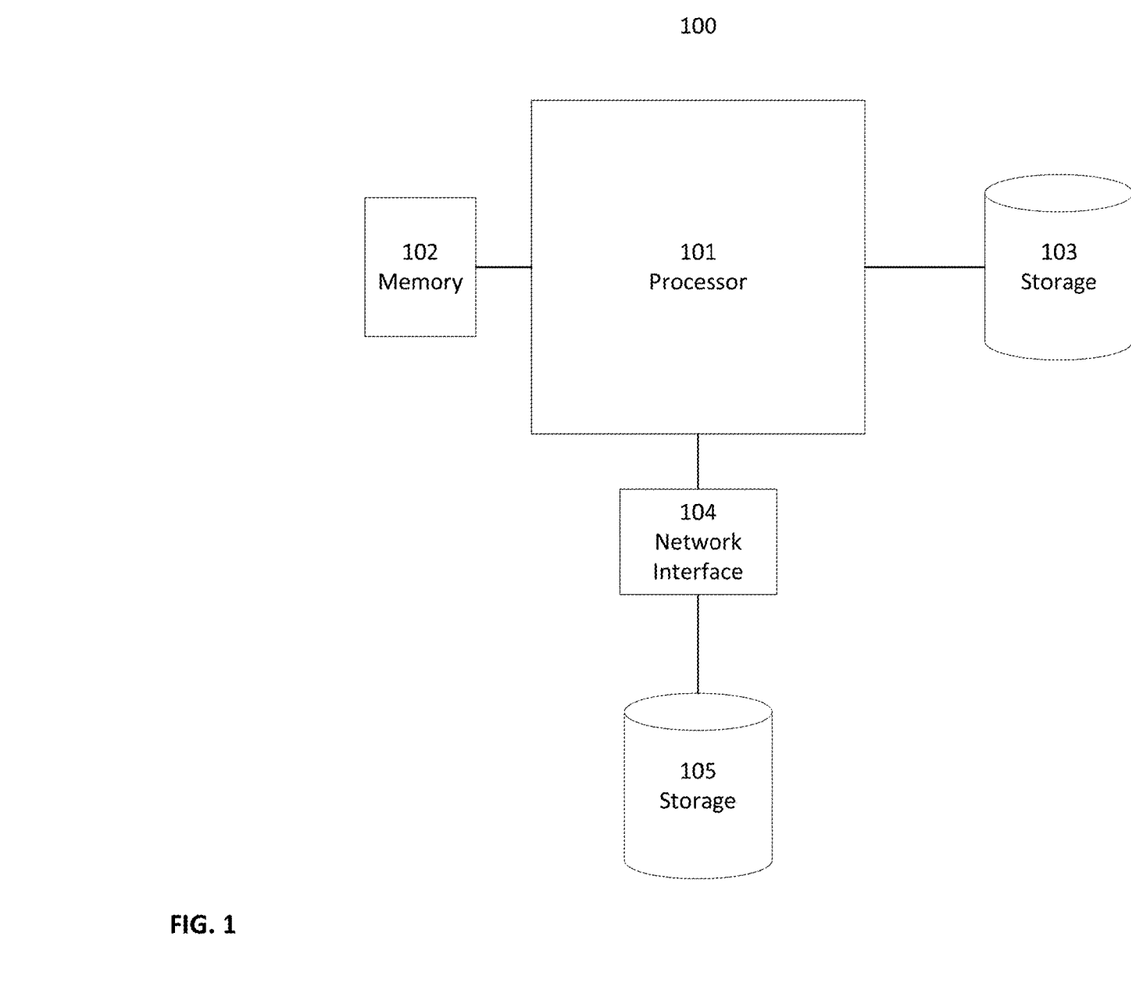
FIG. 1 is a schematic block diagram of an exemplary system, according to some embodiments of the present disclosure.

Reference is now made to FIG. 1, showing a schematic block diagram of an exemplary system 100, according to some embodiments of the present disclosure. In such embodiments, at least one hardware processor 101 is configured to process a stream of events, comprising storing some of the events in at least one digital memory 102. Processing the stream of events may be done by one or more operators executed by at least one hardware processor 101. Optionally, the at least one digital memory is a random access memory (RAM) electrically coupled with at least one hardware processor 101. The at least one digital memory may be a non-volatile memory electrically coupled with at least one hardware processor 101. Flash memory storage is an example of non-volatile memory. In addition, at least one hardware processor 101 is optionally connected to at least one non-volatile storage 103 and 106. Storage 103 may be a hard disk electrically attached to at least one hardware processor 101. Optionally, storage 106 is a network storage connected to at least one hardware processor 101 via a network interface 104 electrically connected to at least one hardware processor 101. Optionally, storing and retrieving data to and from at least one digital memory 102 is faster than storing and retrieving data to and from at least one storage 103 and 106. Optionally, at least one non-volatile storage 103 and 106 comprise a database. In some embodiments, at least one non-volatile storage 103 and 106 comprise a local file system or a distributed file system.

Figure 2:
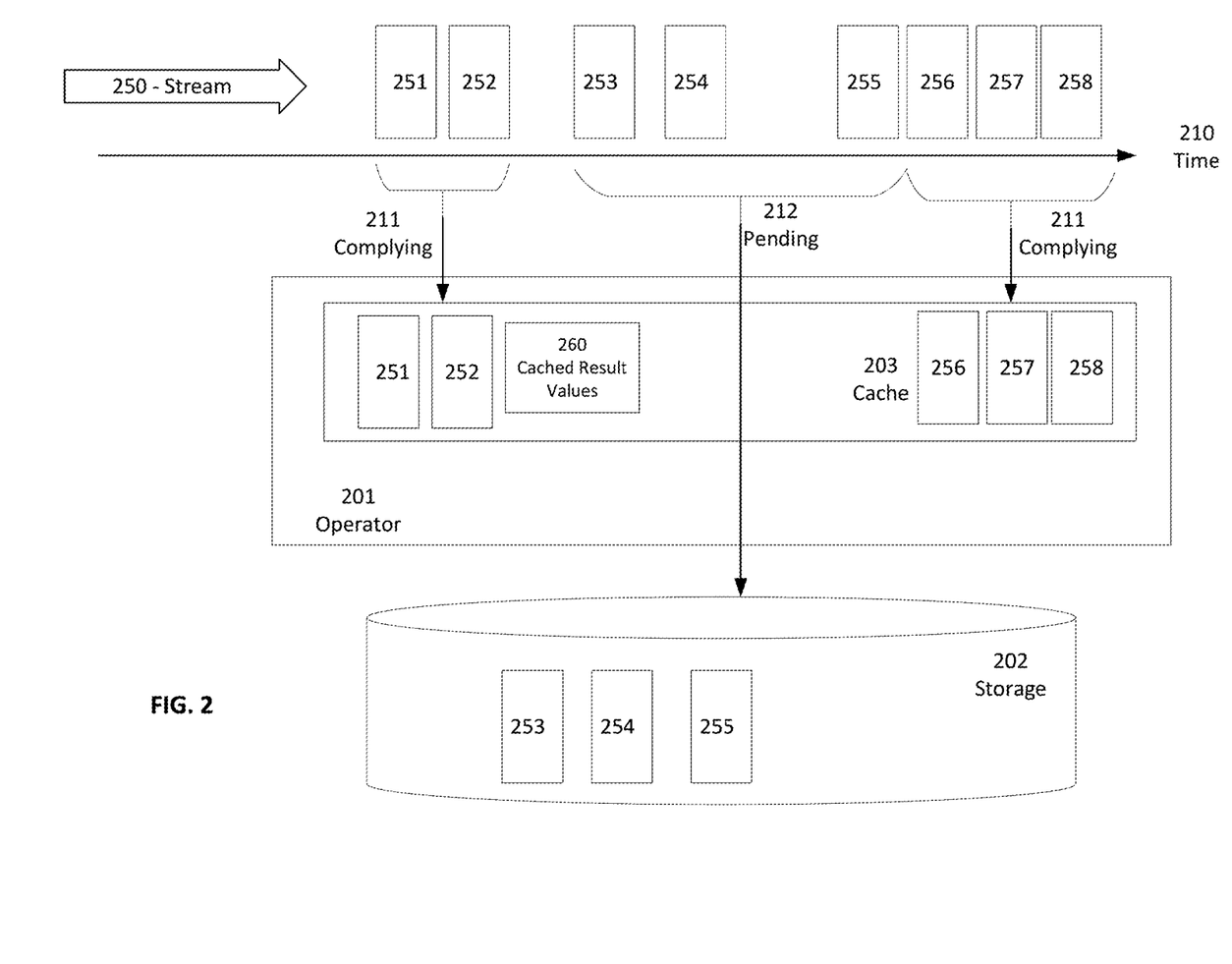
FIG. 2 is a schematic block diagram of the exemplary partitioning of a stream of events between local memory and storage, according to some embodiments of the present disclosure.

In some embodiments of the present invention, an operator stores in digital memory 102 only some of the events of the window it operates on, storing remaining events in non-volatile storage 103 or 106. Reference is now also made to FIG. 2, showing a schematic block diagram of an exemplary partitioning of a window's plurality of events between local memory and storage, according to some embodiments of the present invention. In such embodiments, stream 250 comprises a plurality of events 251, 252, 253, 254, 255, 256, 257 and 258, received by operator 201 over time, depicted by time line 210. In this example, an event is received by operator 201 before all other events to the event's right on timeline 210, for example event 257 may be received by the operator before event 258, but after events 251, 252, 253, 254, 255 and 256. The operator may split the window's plurality of events into a set of complying events 211, comprising events 251, 252, 256, 257 and 258, according to a certain filter test, and a set of pending events 212, comprising events 253, 254 and 255. Optionally, the operator stores complying events 211 in a digital memory 203, and pending events 212 in a non-volatile storage 202. Operator 201 may also store in digital memory one or more cached result values 260, produced by applying one or more preliminary computational functions to events in the stream of events. In such embodiments, an amount of time for the operator to access complying events 211 and one or more cached result values 260 in digital memory 203 is faster than another amount of time for the operator to retrieve pending events 212 from storage 202.

Some global features may be computed by applying a computational function to a set of complying events and one or more cached values, produced by applying one or more preliminary computational functions to some of the stream's plurality of events. For example, when each of the stream's events has a value, and when the global feature is a sum of all event values in a certain window of events, one possible function to compute the sum is to add all the event values in the certain window of events. A possible equivalent function uses a sum of a previous window. The operator may identify a set of dropped events, included in the previous window but not included in the certain window, and a set of added events received after the previous window. The possible equivalent function for computing the sum of all values in the certain window adds the values of the added events to the previous sum and subtracts from the previous sum the values of the dropped events. The resulting sum is the sum of the values of the certain window of events.

Figure 3:
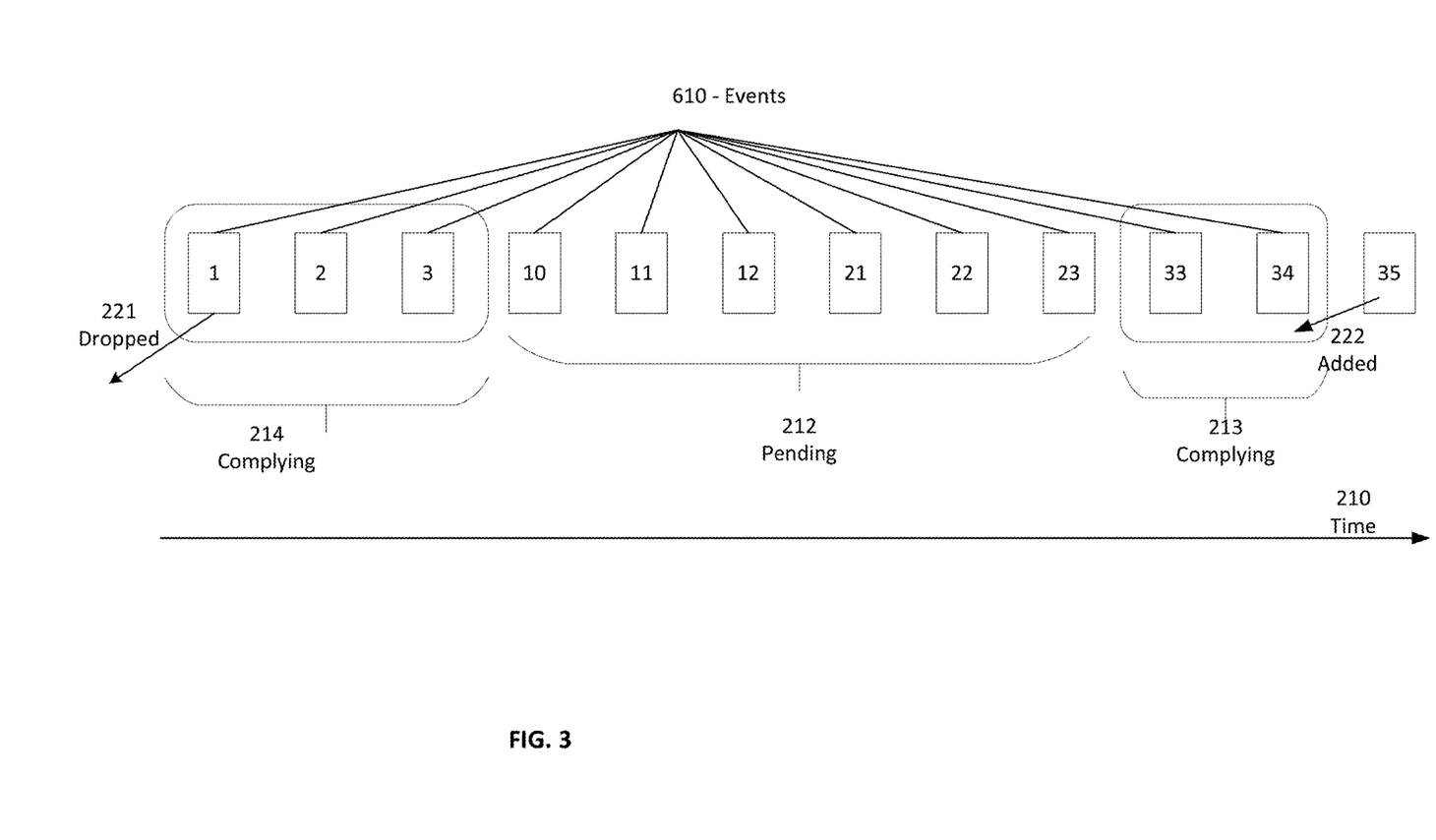
FIG. 3 is a schematic block diagram of the exemplary partitioning of a stream of events of FIG. 2 with regards to a function computation, according to some embodiments of the present disclosure.

Reference is now also made to FIG. 3, showing a schematic block diagram of the exemplary partitioning of a stream of events of FIG. 2 with regards to a function computation, according to some embodiments of the present disclosure. In this example, each event of a plurality of events 610 has another value representing a time of creation relative to an absolute start time. The plurality of events 610 may be ordered according to ascending time of creation. Set 214 comprises some of plurality of events 610, received earliest by the operator. Group 213 comprises some other of plurality of events 610, received latest by the operator. In some embodiments of the present disclosure, to compute a possible feature such as a sum of the values of a window's events, the operator stores in digital memory only earliest arriving events 214 and latest arriving events 213, as well as a cached sum of all values of plurality of events 610. When one or more new events arrive and the operator computes a new sum, the operator optionally selects a new window. Optionally, one or more of complying events 214 are removed from the new window, and thus removed 221 from 214 and discarded. Optionally, the one or more new events are added 222 to 213. A new sum may be computed by subtracting from the cached sum the values of the one or more events removed from 214, and adding to the cached sum the values of the one or more new events added to 213. Other examples of features that can be computed using a plurality of latest arriving events and a plurality of earliest arriving events are an average value and an amount of events.

Time of creation is one possible value an event may have. Other time values are possible, for example time of event arrival (ingestion), and time of event occurrence.

To process a stream of events to compute a global feature by splitting the events between a digital memory and a storage, in some embodiments of the present disclosure, the system implements the following possible method.

Figure 4:
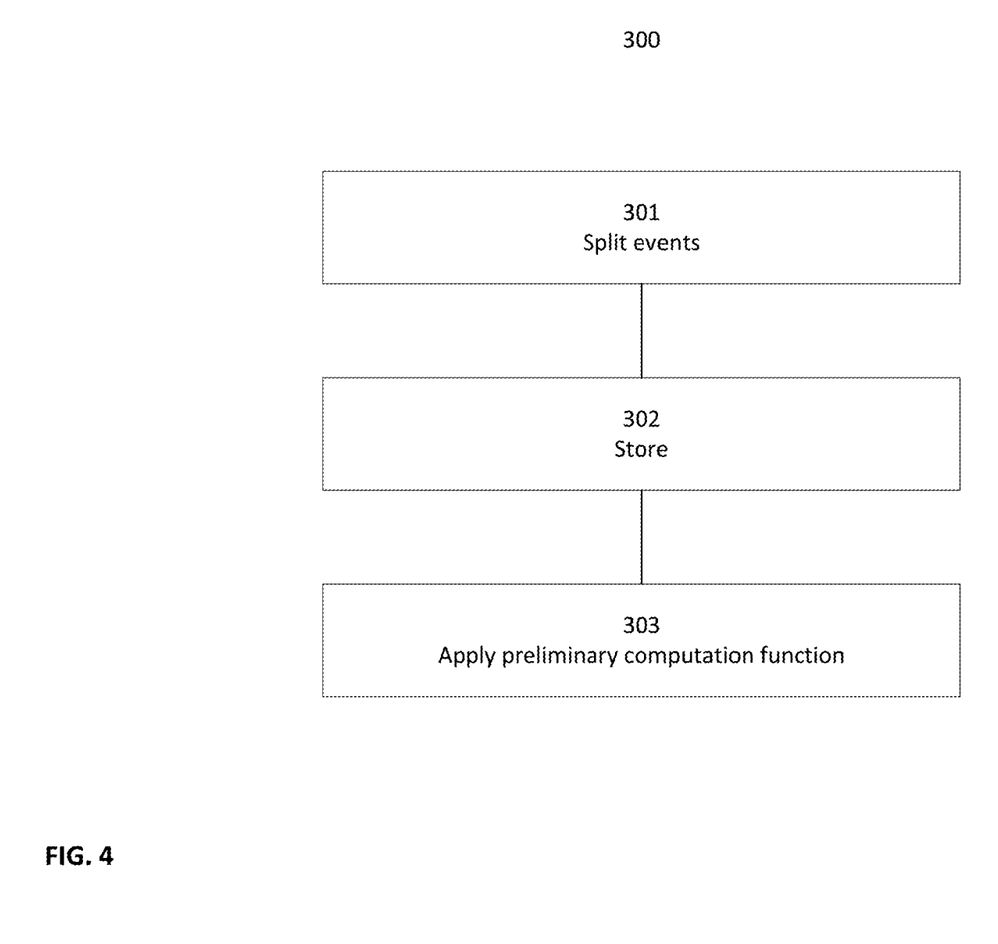
FIG. 4 is a flowchart schematically representing an optional flow of operations for splitting a stream of events, according to some embodiments of the present disclosure.

Reference is now also made to FIG. 4, showing a flowchart schematically representing an optional flow of operations 300 for splitting a stream of events, according to some embodiments of the present disclosure. In these embodiments, an operator executed by at least one hardware processor 101 splits in 301 a stream of event into a plurality of complying events that satisfy one or more first filter tests, and a plurality of remaining pending events. An example of a first filter test is comparing a time of creation of an event to a certain time range relative to a present time. The plurality of complying events may comprise events created no more than a first certain threshold time before a present time. The plurality of complying events may comprise events created at least a second threshold time before the present time. Optionally, each event in the stream of events has a time of creation at the operator. Some of the plurality of complying events may have a time of creation earlier than a time of creation of any of the plurality of pending events. Some of the plurality of complying events may have a time of creation later than a time of creation of any of the plurality of pending events. Another example of a first filter test is comparing a value of an event to one or more threshold values. The plurality of complying events may comprise of events having values greater than one threshold value and less than another threshold value. In 302, the operator optionally stores the plurality of complying events in at least one digital memory, and the plurality of pending events in at least one non-volatile storage. The operator may store some of the plurality of pending events in the at least one digital memory in addition to the storage, for quicker access. In 303, the operator optionally applies one or more preliminary computation functions to the stream of events to produce at least one cached result value. For example, the at least one cached result value may be an amount of values in a plurality of values of the plurality of events of the stream of events or an amount of distinct values in a plurality of values of the plurality of events of the stream of events. Other examples of an at least one cached result value are: an average value of the plurality of event values of the plurality of events of the stream of events, a minimum value of the plurality of event values, a maximum value of the plurality of event values, a sum of the plurality of event values, a median value of the plurality of event values, a quartile value of the plurality of event values, a standard deviation value of the plurality of event values, and a variance value of the plurality of event values. The at least one cached result value may be a result of computing any other statistical or function or other mathematical function. Optionally, the at least one cached result is a result of applying one or more arithmetic operations between one or more values. For example, the at least one cached result value may be computed by multiplying the maximum value of the plurality of event values by an identified amount to produce a first product, multiplying the minimum value of the plurality of event values by another identified amount to produce a second product, and then subtracting the second product from the first product.

Figure 5:
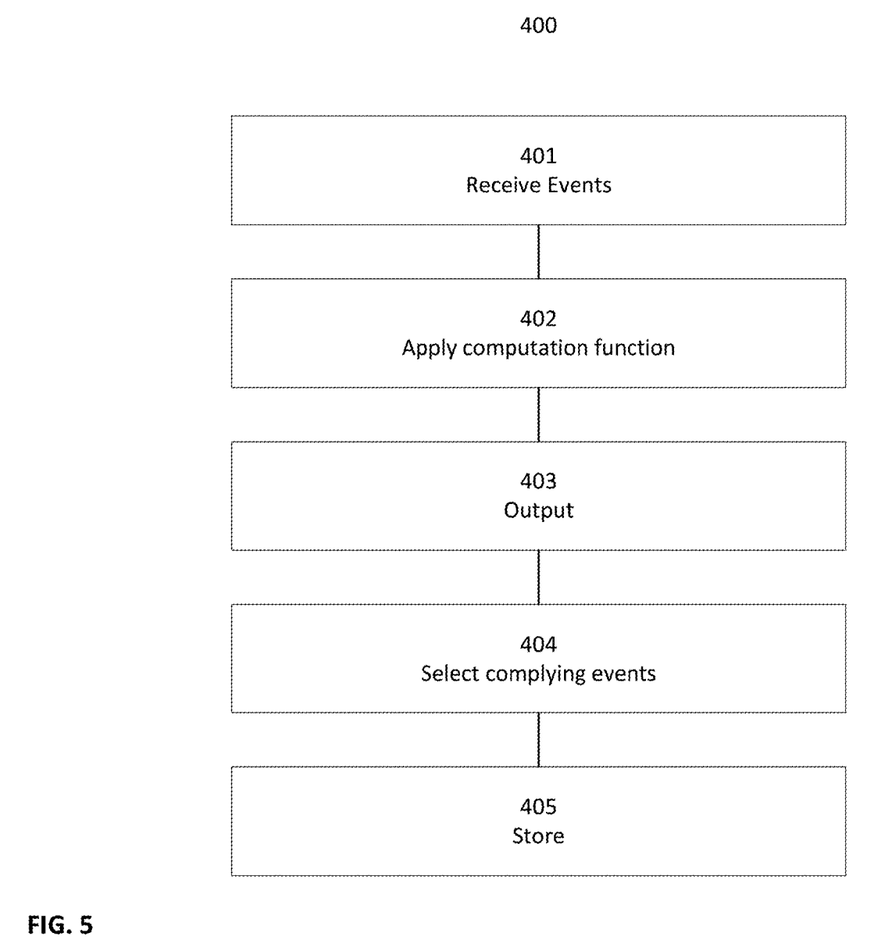
FIG. 5 is a flowchart schematically representing an optional flow of operations for continuously processing a stream of events, according to some embodiments of the present disclosure.

Stream processing is a continuous process, optionally performed in a plurality of iterations. Reference is now also made to FIG. 5, showing a flowchart schematically representing an optional flow of operations 400 for continuously processing a stream of events, according to some embodiments of the present disclosure. In such embodiments, in each iteration or a plurality of iterations the operator receives in 401 one or more new events, and in 402 applies at least one computation function to the plurality of complying events and the at least one cached result value from the at least one digital memory, to obtain at least one new cached result value and at least one output event. The at least one output event may include the at least one new cached result value. Optionally, in 403 the operator outputs the at least one output event on an output stream of events. In 404, the operator optionally selects a new plurality of complying events that satisfy the at least one first filter test from the plurality of complying events and the one or more new events, and in 405 optionally stores the at least one new cached result value and the new plurality of complying events in the at least one digital memory for a next iteration. Optionally, the operator produces the new plurality of complying events before applying the at least one computation function.

Over time, some events of an operator's window of events in the plurality of complying events may no longer satisfy the at least one first filter test. In addition, some other events of an operator's window of events in the plurality of pending events may over time satisfy the at least one first filter test. In some embodiments of the present disclosure, the system implements the following possible method to move events between the at least one digital memory and the at least one storage.

Figure 6:
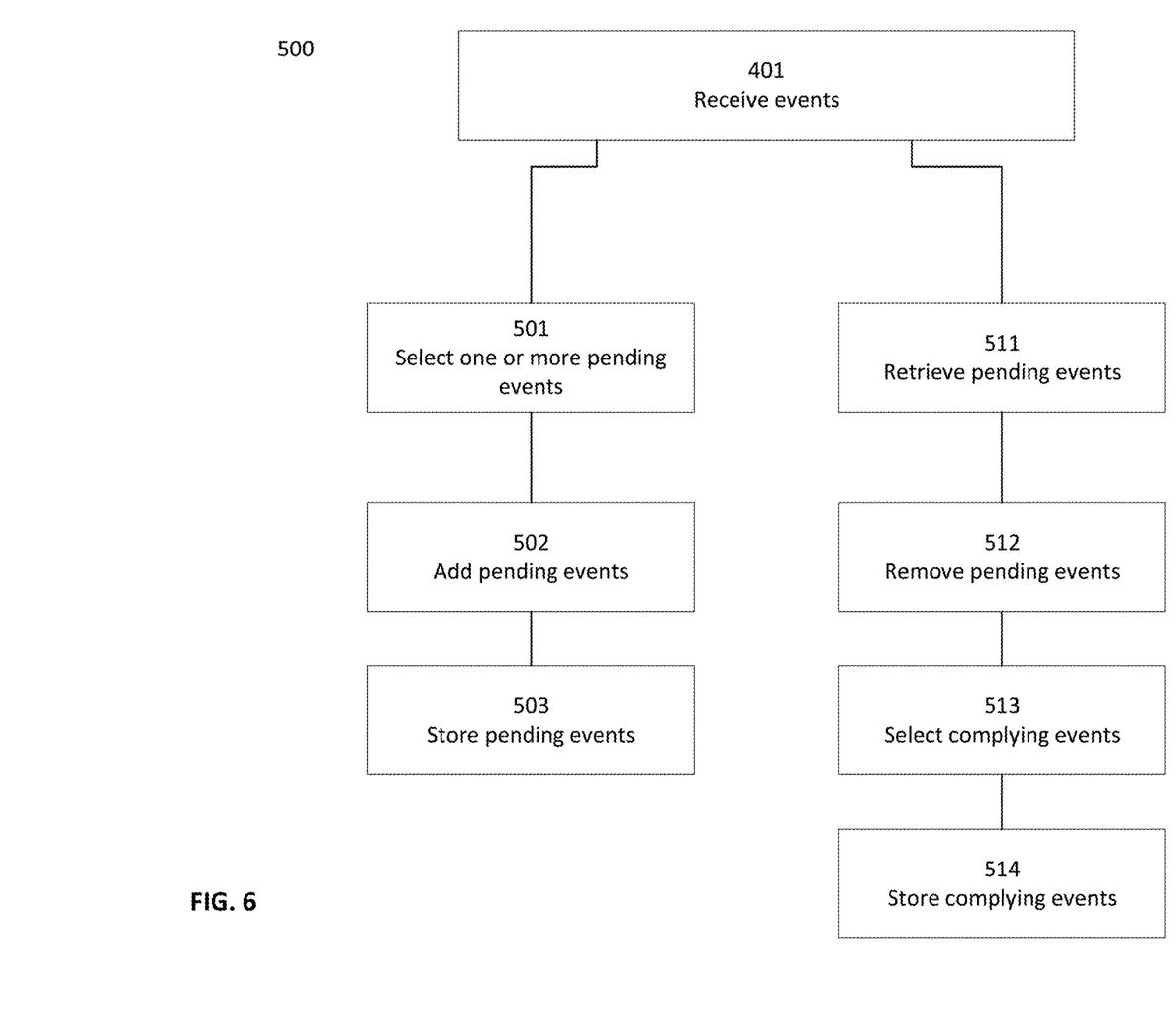
FIG. 6 is a flowchart schematically representing an optional flow of operations for continuously splitting a stream of events, according to some embodiments of the present disclosure.

Reference is now also made to FIG. 6, showing a flowchart schematically representing an optional flow of operations 500 for continuously splitting a stream of events, according to some embodiments of the present disclosure. In such embodiments, in at least one of the plurality of iterations, after receiving one or more new events in 401, the operator selects in 501 one or more new pending events from the one or more new events and the plurality of complying events. In 502, the operator optionally adds the one or more new pending events to the plurality of pending events and in 503 optionally stores the one or more new pending events in the at least one non-volatile storage. Optionally, in 511 the operator retrieves from the at least one non-volatile storage at least one pending event of the plurality of pending events, and in 512 removes the at least one pending event from the plurality of pending events. In 513 the operator optionally selects a second new plurality of complying events that satisfy the at least one first filter test from the plurality of complying events and the at least one pending event, and in 514 optionally stores the second new plurality of compliant events in the at least one digital memory for a next iteration. Optionally, the operator moves some events from the at least one digital memory to the at least one non-volatile storage and vice versa after outputting the at least one output event on the output stream of event, to reduce latency in outputting the at least one output event.

In some embodiments, the operator periodically stores in the at least one non-volatile storage information describing its state, providing fault tolerance by allowing restoring the operator state from the information stored in the at least non-volatile storage. The information describing the operator state optionally comprises the at least one cached value.

Figure 7:
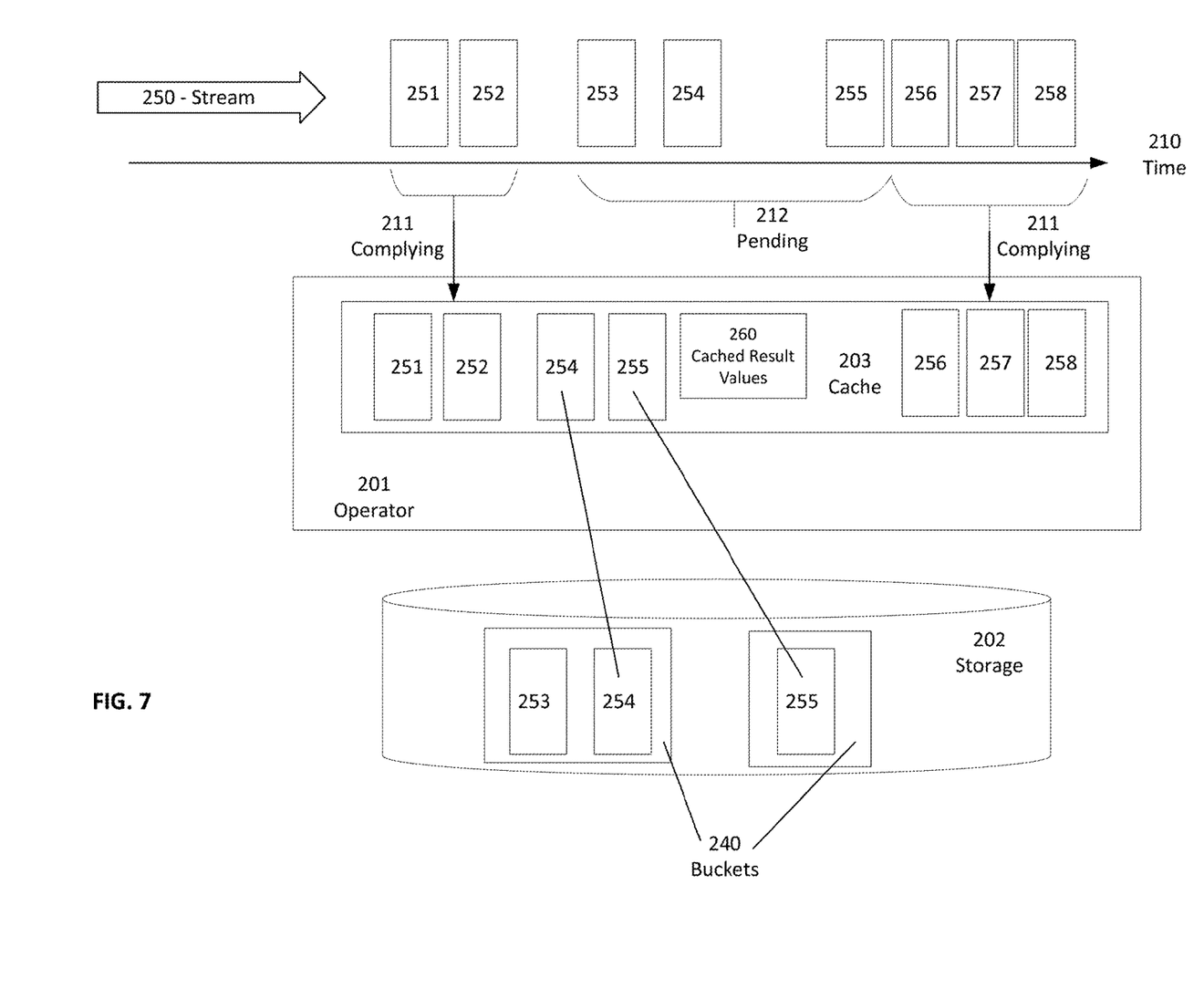
FIG. 7 is a schematic block diagram of another exemplary partitioning of a stream of events including buckets, according to some embodiments of the present disclosure.

Computation of some global features may be possible by splitting the plurality of pending events into a plurality of buckets, each bucket a group of pending events, according to compliance with one or more second filter tests. In some embodiments, the at least one cached result values comprises a value produced by the operator applying the at least one preliminary computation function to at least one of the buckets. Reference is now also made to FIG. 7, showing a schematic block diagram of another exemplary partitioning of a stream of events including buckets, according to some embodiments of the present invention. In some embodiments, the plurality of pending events 253, 254 and 255 is split into one or more buckets 240. Optionally, the plurality of complying events comprises one or more events 254 and 255 from each of the plurality of buckets 240 and operator 201 stores in the at least one digital memory 203 one or more events 254 and 255 from each of the plurality of buckets 240. Optionally, the plurality of complying events comprises all events of at least one bucket of the plurality of buckets 240, and operator 201 stores in the at least one digital memory 203 all the events of the at least one bucket. Optionally, the plurality of pending events are sorted, such that all event values in a first of the plurality of buckets succeed all event values in a second of the plurality of buckets, according to an identified ordering function. For example, when each of the events of the stream has a numerical value, every event in the first bucket may have a value greater than all values of all events of the second bucket. Sorted buckets are useful for computing some global functions such as a median value and a quartile value.

Figure 8:
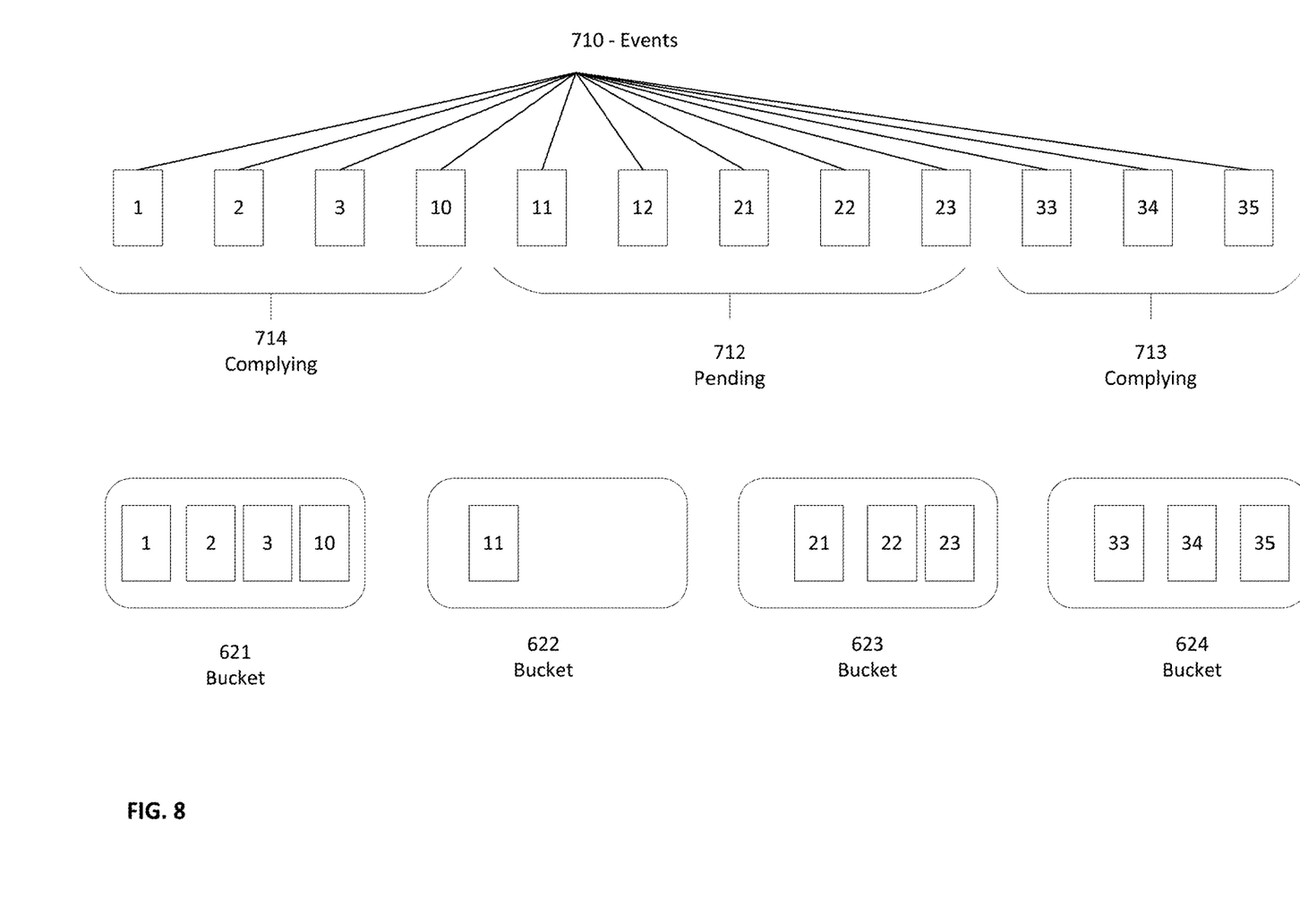
FIG. 8 is a schematic block diagram of the exemplary partitioning of a stream of events of FIG. 7 with regards to another function computation with buckets, according to some embodiments of the present disclosure.

Reference is now also made to FIG. 8, showing a schematic block diagram of the other exemplary partitioning of a stream of events of FIG. 7 with regards to another function computation with buckets, according to some embodiments of the present disclosure. In this example, each event of a plurality of events 710 has a numerical value. The plurality of events 610 may be ordered according to ascending order of numerical value. The plurality of events may be split into a plurality of buckets 621, 622, 623 and 624. In this example 212 is the plurality of pending events. In this example 213 and 214 are the plurality of complying events. In the example, the plurality of complying events comprises all the events in one or more buckets 621 and 624. Optionally, the at least one cached result value comprises a plurality of minimum values, each a minimum value of the plurality of event vales of one of the plurality of buckets. For example, a plurality of cached bucket minimum values may be used when computing a minimum value of all event values. In addition, the plurality of complying events may comprise events of a bucket including an event having a value equal to a minimum value of all cached bucket minimum values. Optionally, the at least one cached result value comprises a plurality of maximum values, each a maximum value of the plurality of event vales of one of the plurality of buckets. For example, a plurality of cached bucket maximum values may be used when computing a maximum value of all event values. In addition, the plurality of complying events may comprise events of a bucket including an event having a value equal to a maximum value of all cached bucket maximum values. Optionally, the at least one cached result value comprises a plurality of range values, each comprising a minimum event value and a maximum event of the plurality of event vales of one of the plurality of buckets. For example, a plurality of cached bucket range values may be used when computing a median value of all event values or a quartile value of all event values. In addition, the plurality of complying events may comprise events of a bucket including an event having a value equal to one of the at least one cached result values, such as a median value of all event values. The at least one cached result value may comprise a plurality of amount values, each an amount of events in one of the plurality of groups of pending events.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computation functions, global features and cached result values will be developed and the scope of the terms "computation function", "global feature" and "cached result value" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for processing an input stream of events to obtain an output stream of events, wherein each of the events of the input stream has an event value, the method comprising:

selecting, from the input stream of events, a plurality of consecutive events using a sliding window to obtain sliding window events;

applying a function to the event values of the sliding window events to obtain an output result value; and in each of a plurality of iterations:
outputting the output result value in the output stream of events;

splitting the sliding window events into a set of complying events, satisfying at least one filter test, and a set of remaining pending events;

storing the set of complying events in a cache memory, the cache memory being a random access memory, and storing the set of remaining pending events in a non-volatile memory;

applying the function to the event values of the set of remaining pending events to obtain at least one preliminary value and storing the at least one preliminary value in the cache memory;

selecting, from the input stream of events, a second plurality of events, wherein the second plurality of events comprises new events that are newly received at the input stream of events;

adding the second plurality of events to the sliding window events;

removing, from the sliding window events, the set of complying events to obtain a new set of sliding window events;

retrieving the at least one preliminary value from the cache memory;

applying the function to the event values of the second plurality of events to obtain a head result; and applying the function to the head result and the at least one preliminary value to obtain a new output result value.

2. The method according to claim 1, wherein the at least one preliminary value, after the applying of the function on the set of remaining pending events, comprises at least one of:

an average value of a plurality of event values of a plurality of events of the input stream of events, a minimum value of the plurality of event values, a maximum value of the plurality of event values, an amount of values in the plurality of event values, an amount of distinct values in the plurality of event values, a sum of the plurality of event values, a median value of the plurality of event values, a quartile value of the plurality of event values, a standard deviation value of the plurality of event values, or a variance value of the plurality of event values.

3. The method according to claim 1, wherein the step of applying the function on the set of remaining pending events comprises:

splitting the plurality of remaining pending events into a plurality of buckets according to a second filter test;

applying the function on each bucket of the plurality of buckets to obtain a corresponding plurality of preliminary values; and storing the plurality of preliminary values in the cache memory.

4. The method according to claim 3, wherein the plurality of preliminary values comprise a plurality of minimum or maximum values of a plurality of event values of the plurality of events in one of the plurality of buckets of the pending events.

5. The method according to claim 3, wherein the plurality of preliminary values comprise a plurality of bucket count values, each bucket count value, of the bucket count values, counting an amount of events in one of the plurality of buckets of the pending events.

6. The method according to claim 3, wherein all event values in a first one of the plurality of buckets of the pending events succeed all event values in a second one of the plurality of buckets of the pending events according to an identified ordering function.

7. The method according to claim 1, wherein each event of the input stream of events has a time value selected from a group consisting of a time of arrival, a time of creation, and a time of occurrence of the event, and wherein at least one event of the plurality of complying events has a time value that is earlier than a time value of any event of the set of remaining pending events.

8. The method according to claim 1, wherein the at least one filter test comprises:

comparing a time of an event to a certain time range relative to a present time; or comparing a value of an event to one or more threshold values.

9. A system for processing an input stream of events to obtain an output stream of events, wherein each of the events of the input stream has an event value the system comprising a processor that is configured to:

select, from the input stream of events, a plurality of consecutive events using a sliding window to obtain sliding window events;

apply a function to the event values of the sliding window events to obtain an output result value; and in each of a plurality of iterations:

output the output result value in the output stream of events;

split the sliding window events into a set of complying events, satisfying at least one filter test, and a set of remaining pending events;

store the set of complying events in a cache memory, the cache memory being a random access memory, and store the set of remaining pending events in a non-volatile memory;

apply the function to the event values of the set of remaining pending events to obtain at least one preliminary value and store the at least one preliminary value in the cache memory;

select, from the input stream of events, a second plurality of events, wherein the second plurality of events comprises new events that are newly received at the input stream of events;

add the second plurality of events to the sliding window events;

remove, from the sliding window events, the set of complying events to obtain a new set of sliding window events;

retrieve the at least one preliminary value from the cache memory;

apply the function to the event values of the second plurality of events to obtain a head result, and apply the function to the head result and the at least one preliminary value, to obtain a new output result value.

10. The system according to claim 9, wherein the non-volatile memory comprises one of a hard disk electrically connected to the processor, a network memory connected to the processor via a network interface, a database, a local file system, a distributed file system, or a cloud storage.

11. A non-transitory computer readable medium comprising program code configured to perform the method according to claim 1 upon the computer program being executed on a computer.

* * * * *